June 1, 1954 — R. E. DOMASKY — 2,680,042

RAIN AWNING FOR WINDSHIELDS

Filed May 2, 1951

ROBERT E. DOMASKY
INVENTOR.

BY Archworth Martin

Attorney

Patented June 1, 1954

2,680,042

UNITED STATES PATENT OFFICE 2,680,042

RAIN AWNING FOR WINDSHIELDS

Robert E. Domasky, Greensburg, Pa.

Application May 2, 1951, Serial No. 224,205

1 Claim. (Cl. 296—95)

This invention relates to awnings or rain shields for automobile windshields and the like, they being particularly useful on rainy evenings at drive-in theatres.

One object of my invention is to provide a rain awning of such form and arrangement that when an automobile is parked at a drive-in theatre, the awning will protect from rain that limited area of the windshield which is in the direct line of vision between the vehicle occupant and the motion picture screen.

These visors which are commonly mounted exteriorly of the vehicle, at the upper edge of the windshield do not sufficiently protect the windshield from rain, particularly when the front wheels are in slightly elevated position, with the result that the rain water will obscure somewhat the view of the picture screen. While it is possible to keep the windshield wipers going to remove rain or snow from the windshield, such procedure is objectionable, on the score of wastefulness of electricity or of the motor fuel, and also because of the wiper blade moving back and forth across the line of vision.

Figure 1:
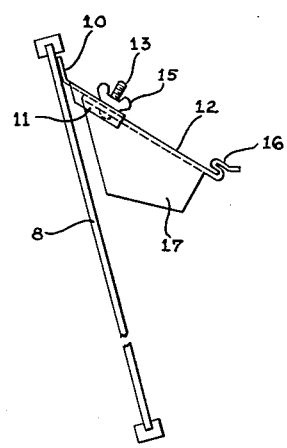
Figure 2:
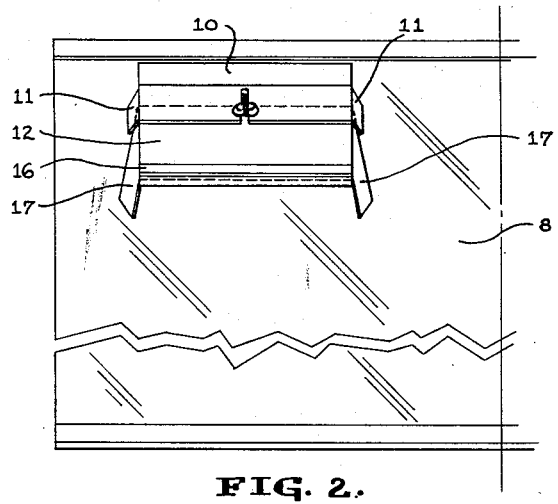
Figure 3:
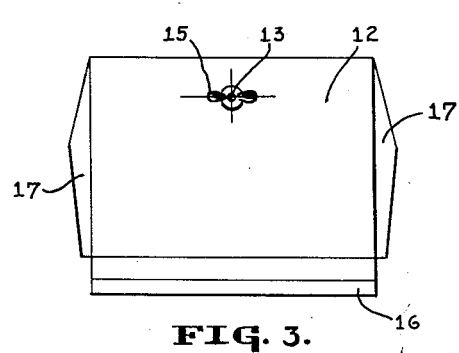
Figure 5:
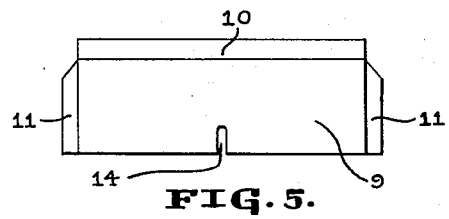
Figure 4:
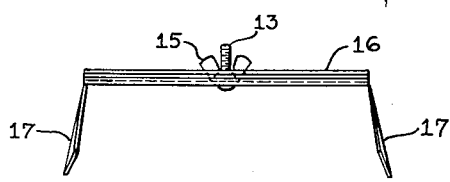
Figure 6:
Figure 7:
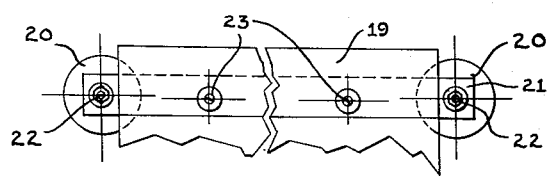

As shown in the accompanying drawing, Figure 1 is an end view of my rain awning in position upon an automobile windshield; Fig. 2 is a face or front view thereof; Fig. 3 is an enlarged plan view of the awning portion of Figs. 1 and 2; Fig. 4 is a front edge view of the structure of Fig. 3; Fig. 5 is an enlarged plan view of the bracket member of Fig. 2; Fig. 6 is a front edge view of the device of Fig. 5, and Fig. 7 is a plan view showing a modification of the structure of Fig. 2.

Referring first to Figs. 1 to 6, I show the device as applied to the windshield 8 of a motor vehicle. The structure comprises a bracket 9 which may be of plastic material that can be cemented to glass. The bracket has a lip portion 10 cemented or glued to the windshield 8, and skirt portions 11.

The awning proper is designated by the numeral 12 and may be of plastic material or sheet metal. A bolt 13 extends through a hole in the body member 12 and is slidable into a slot 14 formed in the lower edge of the bracket 9. The awning is detachably held in place by a wing nut 15.

The forward edge of the awning is bent to gutter-like form as shown at 16, to prevent rain flowing over the foremost edge of the awning, and it is also provided with wings 17 at its side edges, that deflect the rain laterally from the field of vision. It will be understood that the slope of the awning 12 is such that when the forward wheels of the automobile are elevated somewhat, as is common at drive-in theatres, the foremost edge of the awning will be above the line of vision of a person sitting in the vehicle.

Referring now to Fig. 7, I show a bracket member 19 that corresponds to the bracket 9, except that instead of gluing this member to the windshield, it is held there by suction cups 20 that are connected to a bar 21 by bolts 22. The bracket 19 is connected to the bar by bolts or screws 23. The foremost edge of this bracket member 19 can be slotted the same as is the bracket member 9, to receive the bolt 13 and the awning 12. Also, the bracket sheet 19 could be extended forwardly enough to itself serve as an awning. The suction cups would then be removed from the windshield each time that it is desired to remove the awning.

I claim as my invention:

A rain awning for motor vehicle windshields, comprising a bracket plate having a lip on its upper edge for attachment to an upper area of a windshield, with the body portion of the plate sloping downwardly therefrom, skirt-like flanges formed integrally with the side edges of said sloping body, the front lower edge of the body portion having an upwardly-extending slot, an awning plate having an upper portion disposed flatwise at the undersurface of the bracket plate for movement relative thereto and sloping outwardly therefrom, wings on the side edges of the awning plate, in position to extend between the said flanges, and a clamping device carried by the awning plate, in position to extend through the slot and hold the plate at adjusted positions.

References Cited in the file of this patent

UNITED STATES PATENTS

| Number | Name | Date |
|---|---|---|
| 1,119,177 | Krafft | Dec. 1, 1914 |
| 1,346,218 | Lee | July 13, 1920 |
| 1,450,551 | Illch | Apr. 3, 1923 |
| 1,450,977 | Luckett | Apr. 10, 1923 |
| 2,326,267 | Vavroch | Aug. 10, 1943 |

FOREIGN PATENTS

| Number | Country | Date |
|---|---|---|
| 313,367 | Great Britain | June 13, 1929 |